United States Patent [19]

Oka et al.

[11] Patent Number: 4,524,111
[45] Date of Patent: Jun. 18, 1985

[54] WELDABLE PAINT-COATED STEEL SHEETS HAVING EXCELLENT CORROSION RESISTANCE

[75] Inventors: Joji Oka, Tokyo; Hideaki Iwakura, Kanagawa; Narumi Ando, Tokyo; Kiyotoshi Iwasaki, Fukuoka; Yoshio Shindow, Chiba, all of Japan

[73] Assignee: Nippon Steel Corporation, Tokyo, Japan

[21] Appl. No.: 605,998

[22] Filed: May 3, 1984

Related U.S. Application Data

[63] Continuation-in-part of Ser. No. 377,595, May 12, 1982, abandoned.

[30] Foreign Application Priority Data

May 19, 1981 [JP] Japan .................................. 56-74281
May 19, 1981 [JP] Japan .................................. 56-74282
May 19, 1981 [JP] Japan .................................. 56-74283

[51] Int. Cl.$^3$ ........................ B32B 15/08; B32B 15/02
[52] U.S. Cl. ................................ 428/551; 428/624; 428/659; 427/406; 106/14.21
[58] Field of Search ............. 428/551, 556, 561, 562, 428/659, 624, 660; 427/406; 106/1.17, 14.21, 14.39, 14.44

[56] References Cited

U.S. PATENT DOCUMENTS

| | | | |
|---|---|---|---|
| 3,420,754 | 1/1969 | Roehl | 428/659 X |
| 3,505,043 | 4/1970 | Lee et al. | 428/659 |
| 3,562,124 | 2/1971 | Leon et al. | 106/1.17 X |
| 3,759,756 | 9/1973 | Lomasney et al. | 106/1.17 X |
| 3,782,909 | 1/1974 | Cleary et al. | 427/406 X |
| 3,904,555 | 9/1975 | Matsuda et al. | 428/402 X |
| 3,977,842 | 8/1976 | Mayhew | 428/659 |
| 4,079,163 | 3/1978 | Tanaka et al. | 428/328 |
| 4,152,472 | 5/1979 | Ohbu et al. | 428/659 X |
| 4,209,555 | 6/1980 | Stewart | 106/1.17 X |
| 4,219,358 | 8/1980 | Hayashi et al. | 106/1.17 |
| 4,252,866 | 2/1981 | Matsudo et al. | 427/406 X |
| 4,329,402 | 5/1982 | Hyner et al. | 428/659 X |
| 4,360,384 | 11/1982 | McKaveney et al. | 106/14.39 X |

FOREIGN PATENT DOCUMENTS

| | | | |
|---|---|---|---|
| 15851 | 6/1970 | Japan | 428/659 |
| 112731 | 9/1979 | Japan | 428/659 |

*Primary Examiner*—Ben R. Padgett
*Assistant Examiner*—Matthew A. Thexton
*Attorney, Agent, or Firm*—Wenderoth, Lind & Ponack

[57] ABSTRACT

A weldable paint-coated steel sheet having improved corrosion resistance, weldability and workability, comprising a zinc alloy coated steel substrate and a paint coating applied thereon, said paint coating containing zinc alloy powder and at least one of the groups consisting of zinc powder and hard electric conductive powder.

10 Claims, No Drawings

WELDABLE PAINT-COATED STEEL SHEETS HAVING EXCELLENT CORROSION RESISTANCE

This application is a continuation-in-part, of application Ser. No. 377,595, fied May 12, 1982, said parent application to be abandoned after being accorded an effective filing date for the presently submitted continuation-in-part application.

BACKGROUND OF THE INVENTION

1. Field of the Invention

The present invention relates to weldable paint-coated steel sheets applicable to electric resistance welding and having excellent corrosion resistance.

In recent years much salt is used for preventing icing of snow on highway roads, and corrosion problems due to the salt have been more and more serious in automobile industries, and for overcoming these problems automobile makers have been making their all efforts in improvement of the corrosion resistance of automobiles by adopting chemical conversion treatments, improving the paint coatings themselves and structural designs of automobiles as well as by adopting surface-treated steel sheets. As for the surface treated steel sheets used for rust prevention in automobiles, metal coated steel sheets, such as zinc or zinc alloy coated steel sheets, as well as weldable paint-coated steel sheets coated with zinc-rich paints are widely used.

In the case of the zinc-rich paint coatings, adhesion after working, weldability and corrosion resistance depend on the contents of zinc powder contained in the paints. Thus, from the point of weldability, a larger content of zinc powder is more desirable, but lowers the adhesion and if the zinc powder content exceeds about 80 weight percent, the paint coatings are very likely to peel off or break into powder, a notorious phenomenon widely known as "powdering", particularly when paint-coated steel sheets are formed into doors, fenders and so on, thus hindering the press forming operation.

On the other hand, regarding the corrosion resistance, it is well known that the so-called sacrifying corrosion resistance cannot be effected unless the zinc powder is contained in amounts more than 90 weight percent, but such large zinc powder contents practically prohibit the press forming operation.

As briefly explained above, it is quite difficult to satisfy all of the adhesion, the weldability and the corrosion resistance with weldable paint-coated steel sheets coated with zinc powder containing paints.

For these reasons, the general tendencies have been that paint-coated steel sheets with preference given to the adhesion after working have been commercially produced.

Therefore, paint-coated steel sheets now commercially available are inferior in the rust preventiveness and where the base metal is exposed due to damage of the paint coatings or cutting of the sheets, red rust can quickly be formed in a short time.

2. Description of Prior Arts

In order to overcome the above defects and difficulties, the present inventors proposed paint-coated steel sheets produced by applying a paint containing a small amount of zinc powder on zinc metal coated steel sheets, as disclosed in Japanese Patent Publication No. Sho 54-11331, and these paint-coated steel sheets have been found satisfactory to overcome the above defects and difficulties.

However, further studies on adequateness of the properties of these paint-coated steel sheets for use in automobiles have revealed that when these sheets are used at parts, such as hem worked parts of doors, which are subjected to deposition of water or dust all the time, the base zinc coating is selectively attacked and corrosion products accumulate beneath the paint coating to creep back the paint coating, thus finally causing peel off of the paint coating and nullifying the rust preventive force.

The above phenomenon can be explained from the high dissolution rate of zinc in a solution containing salts. For example, it is known that in a salt spray test specified by JIS-Z-2731, the zinc coating dissolves at an abnormally rapid rate as high as about 1 $g/m^2$. hr and this abnormally rapid dissolution rate of the zinc coating is attributed for the creep back and peel off of the paint coating, and hence the final loss of the rust preventiveness.

The present inventors have made extensive studies in order to overcome the above defect of the weldable paint-coated steel sheets using zinc coated substrates, and found that if the zinc coated substrate is replaced by a zinc alloy coated substrate for the weldable paint-coated steel sheet, the resultant corrosion resistance can be surprisingly and incomparably improved over the corrosion resistance obtained by the paint-coated steel sheet using the zinc coated substrate.

The present invention has been completed on the basis of the above discovery.

SUMMARY OF THE INVENTION

Therefore, one of the objects of the present invention is to provide weldable paint-coated steel sheets applicable to electric resistance welding and having excellent corrosion resistance.

The paint-coated steel sheets according to the present invention comprises a zinc alloy coated steel substrate and a weldable paint coating applied on the substrate, which paint coating contains zinc powder or zinc alloy powder and a hard electric conductive powder.

Other objects of the present invention will be understood from the descriptions made hereinafter.

DETAILED DESCRIPTION OF THE INVENTION

As the weldable paints, zinc-rich paints, such as one containing not less than 80 weight percent of zinc powder, and small amounts of metal powders such as aluminum, magnesium powders and carbon powder are conventionally known.

The zinc-rich paints, as stated hereinbefore, have a defect that they are incompatible with respect to the resultant adhesion and the resultant weldability.

Therefore, the paints used in the present invention have solved the incompatibility of the conventional zinc-rich paints, and contain at least 70 weight percent of zinc alloy powder with respect to the non-volatile matters of the paints. According to a modification, the paints may be ones containing zinc powder and zinc alloy powder, and according to a further modification, the paints may contain zinc powder and/or zinc alloy powder and a hard electric conductive powder.

The zinc alloy powder used in the present invention includes zinc alloy powders containing at least one of aluminum, titanium, magnesium, manganese, copper, nickel, cobalt, etc. and these zinc alloy powders are harder and have better corrosion resistance than the zinc powder.

The hard electric conductive powder used in the present invention includes powders of nickel, cobalt, manganese, chromium, and their alloys, powdered carbides of titanium zirconium, hafnium, vanadium, niobium, tantalum, chromium, tungsten, molybdenum, and their mixtures. They are harder than the zinc powder and may be used in single or in combination.

By substituting part or whole of the zinc powder in the zinc-rich paints with the above hard electric conductive powder or with the zinc alloy powder, it is possible to obtain weldability equal to that obtained by the zinc powder straight paints with less total content of metals, and thus better adhesion of paint coatings after working can be obtained.

According to the modifications of the paints, the content of the zinc alloy powder or the hard electric conductive powder should be determined mainly from the point of weldability, which depends on the total content of electric conductive powders and the kind of the powders. In the case of zinc alloy powders, remarkable effects can be obtained by addition of 40% or larger by weight of zinc alloy powders with respect to the total non-volatile matters in the paint composition, 20% or larger by weight of hard metallic powder, or 5% or larger by weight of carbide powders.

Thus in the case of weldable paints containing only the zinc powder, it is necessary that at least 85% by weight of zinc powder is contained in order to assure weldability enough for 2000 successive weldings. However, if the zinc powder is contained in amounts of 85% or larger, the powdering or peeling off phenomenon of the paint coating is caused in 5T bending tests, and the powdering is remarkable also in the press forming of fenders, thus hindering continuous press operation.

In the cases of the paints containing the zinc alloy powder which is harder than zinc powder, or containing the hard electric conductive powder together with the zinc alloy powder according to the present invention, there is no danger of the powdering or peeling off of the paint coatings, and the press forming of fenders can be continuously performed almost without the danger of the powdering problem.

Regarding the content of zinc powder, it is necessary that at least 5% by weight, more preferably at least 30% by weight of zinc powder with respect to the total content of non-volatile matters in the paint is contained for assuring the desired corrosion resistance.

However, in the case of the paints modified by addition of zinc alloy powder, part of the zinc powder can be substituted by the zinc alloy powder because the latter itself can provide some improvement of the corrosion resistance.

The paints according to the present invention may further contain small amounts of aluminum, graphite, tin, magnesium, etc. all in the powder form. These additives are effective to enhance the corrosion resistance and weldability. As for the vehicle of the paint, there is no specific limitation, and resins, such as epoxy, polyester, acryl, vinyl, urethan may be selectively used depending on the final applications of the paint-coated steel sheets.

As the zinc alloy coated substrates used in the present invention, zinc-base alloys containing 3 to 20% by weight of nickel, or such alloys further containing one or more of not more than 3% by weight of cobalt, not more than 3% by weight of chromium, not larger than 5% by weight of iron, or zinc-base alloys containing 3 to 80% by weight of iron, 3 to 60% by weight of aluminum, not more than 20% by weight of manganese, or not more than 5% by weight of magnesium may be used, and then zinc-base alloy coatings may be applied in a thickness not less than 1 g/m$^2$.

The term "alloy" used in this invention is not limited to intermetallic compounds or solid solutions of zinc, nickel, cobalt, chromium, iron, aluminum, manganese and magnesium, etc. It also may include these metals in their metallic state, or oxide or other compound state.

According to the present invention, the zinc alloy substrates are subjected, if necessary, to paint coating pretreatments, such as chromating, phosphating and then applied with the paints mentioned above in a thickness ranging from 3 to 20$\mu$, and the paint coatings are cured by firing, for example, to obtain weldable paint-coated steel sheets.

If the paint coatings are less than 3$\mu$, the desired corrosion resistance cannot be obtained, but if they are beyond 20$\mu$, the weldability is deteriorated.

The most important advantage of the weldable paint-coated steel sheets according to the present invention is that they exhibit sacrifying corrosion resistance and a greatly reduced corrosion rate so that the formation of red rust and creep back of the paint coatings at damaged portions or cut edge portions of the paint-coated steel sheets are greatly retarded.

This technical advantage will be explained in connection with embodiments using zinc-nickel alloy coated substrates.

The present inventors have investigated on the results of salt spray tests for estimating the corrosion resistance of zinc-nickel alloy coated steel sheets and zinc-nickel cobalt alloy coated steel sheets, and have found that if the nickel content exceeds 3% by weight, improvement of corrosion resistance becomes apparent, and along further increase of the nickel content, the corrosion resistance will be further enhanced, and at the nickel content of 5% by weight, the corrosion resistance is twice higher than that obtained by the zinc-straight coated steel sheets, and at 15% by weight of nickel, the corrosion resistance is four times higher than that obtained by the zinc-straight coated steel sheets.

As the nickel content is further increased, the corrosion rate itself is further reduced, but the sacrifying corrosion resistance is also reduced so that the red rust is very likely to generate at the damaged portions and cut edges.

Further the present inventors have made investigation on the corrosion resistance obtainable when the weldable paints mentioned above are coated on the zinc-nickel alloy coated steel sheets and the zinc-nickel-cobalt alloy coated steel sheets and have found that the corrosion resistance improvement thus obtained is surprisingly remarkable as compared with that obtainable by applying similar paint coatings on zinc coated steel sheets.

For example, when an epoxy weldable paint containing 40% by weight of zinc powder, and 35% by weight of stainless steel powder was applied in a thickness of 10$\mu$ on a zinc coated steel sheet with 20 g/m$^2$ zinc coating and also on a zinc-nickel alloy coated steel sheet with 20 g/m$^2$ zinc-nickel alloy coating containing 15% nickel, then the paint coatings were cured, and the corrosion resistance of the paint-coated steel sheets thus obtained was investigated by the salt spray test, and the results are that in the case of the zinc coated substrate, the creep back of the paint coating was caused after 24 hours over a width of 10 mm from the cut edge, while in the case of the zinc alloy coated substrate no creep back of the paint coating was observed and only very little of white rust formation was observed even after 240 hours.

At the damaged portions where the substrates are exposed, the formation of white rust and the ocurrence of creep back of the paint coating were observed in 500 hours in the case of the zinc coated steel sheets while such white rust or creep back was not observed even in 4000 hours in the case of the zinc alloy coated steel sheets.

Thus according to the present invention, remarkable improvement of corrosion resistance unexpectable from the improvement by the alloy coating alone can be obtained.

It is also noteworthy regarding the nickel content in the zinc alloy coating that when the nickel content exceeds 15% by weight the sacrificing corrosion resistance effect become insufficient in the case of the alloy coating alone, while in the present invention the sacrificing corrosion resistance is sufficient up to 20% by weight of nickel. This advantage may be attributed to the fact that the zinc powder contained in the paint coating cooperates with the coating metal to protect the base steel against the corrosion and further that the presence of nickel, cobalt, aluminum, magnesium manganese etc. tend to stabilize the corrosion products into $Zn(OH)_2$ which is preventive to the oxygen reduction reaction, and this $Zn(OH)_2$ is retained by the paint itself so that it covers the sheet surface for a long period of time.

The cobalt content in the paint coatings is effective to improve the corrosion resistance, and at 3% by weight it reduces the corrosion rate by about 10%. However, cobalt contents more than 3% do not produce no substantial improvement of corrosion resistance, but only increases the production cost and causes difficulties in the coating operation. Therefore, the cobalt content should desirably be maintained not more than 3% by weight.

Meanwhile, chromium is inherently difficult to include in the metal coating, and it can be contained only up to 3% by weight. Although such chromium contents will not produce a substantial corrosion resistance of the metal coating itself, they produce a kind of chromating effect when the paint coatings defined herein are applied, so that the adhesion and corrosion resistance of the paint coatings are improved.

The iron content in the zinc-base alloy coatings not only improves the corrosion resistance of zinc, but also increases the eutectoid amount of chromium into the coating metal so that it enhances the corrosion resistance of the metal coating, and when an electrolytic chromate treatment is performed as the paint coating pretreatment, a chromium deposition several times larger than that obtained without the iron content can be obtained by the same amount of electricity, so that the iron content has an advantage that a desired amount of chromium deposition can be obtained by less amount of electricity.

For example, if a cathodic electrolytic chromate treatment is performed in a bath containing 250 g/l of $CrO_3$ and 10 g/l of $H_2SO_4$ at 50° C., 20 c/dm², 30 c/dm² and 30 c/dm² are required for obtaining 30 mg/m² of chromium deposition in the cases of Zn-coating, 13% Ni-Zn alloy coating, 13% Ni-0.05%Cr-Zn alloy coating, respectively, while in the case of 13%Ni-3%Fe-0.05%Cr-Zn alloy coating according to the present invention, only 12 c/dm² is sufficient for the same chromium deposition.

While an electrolytic chromating treatment is generally used, a roll-on chromating procedure may also be employed. To accomplish this, a chromating procedure may be used employing, for example, ACCOMET C-50 which means that the metal sample is treated by rolling on the ACCOMET so that the coating is present on the metal surface at an amount of 50 mg/m². This ACCOMET C treatment is well-known in the art.

The improvement of corrosion resistance obtainable by the iron content itself is smaller than that obtainable by the nickel content, and at 5% by weight, it can reduce the corrosion rate by about 20% at most, but it has an advantageous tendency to make the electric potential of the metal coating to come close to that of iron so that the occurrence of creep back of the paint coating can be reduced. For this purpose and for the purpose of enhancing the chromating effect mentioned before, at least 0.5% by weight of iron content is required. However, iron contents exceeding 5% by weight tend to weaken the sacrificing corrosion resistance in some cases, particularly when a large amount of nickel is also contained, thus causing adverse effects for the objects of the present invention.

However, in the case of Zn-Fe alloy coatings containing no nickel, a larger amount of iron can be contained, namely up to about 80% by weight of iron can be safely contained. Iron contents exceeding this produce no sacrificing corrosion resistance effect, and even with iron contents ranging between 30 to 80% by weight, the sacrificing corrosion resistance is sometimes insufficient. Therefore, a preferable range of the iron content is from 3 to 30% by weight. With iron contents less than 3% by weight cannot assure the desired improvement of corrosion resistance.

Aluminum is also effective to cause the corrosion potential to come close to the potential of iron and stabilize the corrosion product into $Zn(OH)_2$. These effects can be observed with aluminum contents of 3% by weight or higher, and increase as the aluminum content is increased. However, aluminum contents beyond 60% by weight lose the sacrificing corrosion resistance effect, thus contrary to the objects of the present invention.

Magnesium and manganese are also effective to stabilize the corrosion products into $Zn(OH)_2$. The upper limits of these additives are determined depending on the technical accessibility of the coating operation, and not larger than 5% by weight of magnesium and not larger than 20% by weight of manganese are practically recommendable.

In the present invention, there is no specific limitation with regards to the amounts of metal coatings, and final products can be given corrosion resistance corresponding to given amounts of the metal coatings, but for the desired effects of metal coatings, at least 1 g/m², preferably 3 g/m², and more preferably also from the point of production cost, 5 to 20 g/m² of metal coatings are applied. Similarly, there is no specific limitations for the paint coatings, but from the considerations of assuring better effects of the paint coatings and reducing the production cost, 3 to 20μ, more appropriately 5 to 15μ of paint coatings are applied.

Regarding the pretreatments which are done prior to the paint coatings, ordinary phosphate, chromate, complex oxide treatments and other conventionally known treatments can be applied, but an electrolytic chromate treatment is best for the present invention because it can assure full developments of advantages of the present invention.

The present invention will be better understood from the embodiments shown in the tables.

In the embodiments, the paints are epoxy varnish for prepainting available from Nippon Yushi Kabushiki Kaisha and the paint coatings are fired at 250° C. for 50 seconds.

The workability tests in the following Tables represent the adhesion of the paint after binding the painted or coated steel panels to an angle of 180°, according to a slightly modified variation of the ECCA-T7 (European Coil Coating Association) test method. Regarding this method, the terms and ~ represent excellent adhesion of the paint or coating on the steel panels after forming or bending; the terms and ~ represent good adhesion results; the terms Δ and Δ~X fair results; and the term X poor adhesion results in the ECCA test method.

According to the workability or modified ECCA-T7 Test used in the various Examples as illustrated in Tables 1—1 to 1-4, the various steel sheets of a thickness of 0.7 mm were subjected to a bending test to determine the adhesive quality of the paint coatings. This is determined by bending the coated steel sheets by means of an apparatus, e.g. a die and punch combination, such as shown in FIG. 1 with the steel sheets bent as in both FIGS. 1 and 2.

The various T-values are determined by the following formula:

$$T = \frac{\text{minimum mandrel diameter}}{\text{metal thickness}}.$$

According to FIGS. 1 and 2 the various T values are as follows:

0T = The case wherein the coated steel sample (i.e. the test piece) is bent at 180° (i.e. the most severe case of bending).

1T = The situation wherein the coated steel sheet sample is bent at approximately 180° with a sheet of the same thickness as the test piece sandwiched therebetween, i.e. the inner metal sheet thickness represents the mandrel diameter.

2T = The case wherein the coated steel sheet is bent at approximately 180° over two metal sheets each of the same thickness as the test piece.

3T, 4T and 5T, etc., represent similar situations wherein the coated steel sheets are bent around mandrels or metal sheets 3, 4 and 5 times the thickness of the test piece, respectively; wherein the number preceding the "T" represents the number of times greater the mandrel diameter or sheet thickness is in respect to the thickness of the test sample. Or looking at it another way 3T, 4T and 5T mean that the diameter of the mandrel (or metal sheet used to bend the test pieces as in FIGS. 1 and 2) are three, four and five times the thickness of the sample or test piece.

After the samples are bent as above, the bent samples are removed from the bending machine, and a Scotch tape applied with finger pressure (in actual practice Scotch 600 tape is used which is sold by Sumitomo Three M Co., Ltd.). The tape was then immediately pulled off and the amount of peeling estimated.

TABLE 1

| | Example 1 | Ex. 2 | Ex. 3 | Ex. 4 | Ex. 5 | Ex. 6 | Ex. 7 | Ex. 8 | Ex. 9 | Ex. 10 | Comp. 1 | Comp. 2 | Comp. 3 |
|---|---|---|---|---|---|---|---|---|---|---|---|---|---|
| Steel Sheet | | | | | | | | | | | | | |
| Ni (wt %) | 15 | 13 | 3 | 13 | 13 | 13 | 15 | 13 | 13 | 20 | 0 | 0 | non-coated steel sheet |
| Co (wt %) | 0 | 3 | 3 | 0.3 | 0.3 | 0.3 | 0 | 0.3 | 0.3 | 0 | 0 | 0 | |
| Bal. Zn | 20 | 20 | 20 | 5 | 1 | 20 | 20 | 20 | 20 | 20 | 20 | 20 | |
| Coating Amount (g/m²) | | | | | | | | | | | | | |
| Chemical Conversion (mg/m²) | Electrolytic Chromating 30 | Electrolytic Chromating 30 | Electrolytic Chromating 30 | Electrolytic Chromating 30 | | ACCOMET C 50*2 | Electrolytic Chromating 30 | Electrolytic Chromating 30 | Electrolytic Chromating 30 | Electrolytic Chromating 30 | Electrolytic Chromating 30 | Electrolytic Chromating 30 | Phosphating |
| Paint | | | | | | | | | | | | | |
| Zn powder (wt %) | 40 | 60 | 65 | 5 | 40 | 40 | 70 | 40 | 40 | 65 | 40 | 85 | 85 |
| 5% Al—Zn powder (wt %) | — | — | — | — | — | — | — | — | — | — | — | — | — |
| Ti C powder (wt %) | — | 12 | — | 20 | — | — | — | — | — | — | — | — | — |
| W C powder (wt %) | — | — | 5 | — | — | — | — | — | — | 5 | — | — | — |
| Ni powder (wt %) | — | — | — | — | — | — | — | — | — | — | — | — | — |
| Stainless Steel powder (wt %) | 35 | — | — | 35 | 35 | 35 | — | 35 | 35 | — | 35 | — | — |
| Coating Thickness (μ) | 10 | 10 | 10 | 10 | 10 | 10 | 10 | 5 | 3 | 10 | 10 | 10 | 10 |
| **Workability*1** | | | | | | | | | | | | | |
| 2 T | ○ | ○ | ○ | ○ | ○ | ○ | ~Δ | ○ | | ○ | ○ | ~Δ | Δ~Δ |
| 3 T | | | | | | | | | | | | | |
| 4 T | | | | | | | | | | | | | |
| 5 T | | | | | | | | | | | | | ○ |
| Salt Spray Test | | | | | | | | | | | | | |
| Flat Portion (hrs) | 4000 | 5000 | 1000 | 1000 | 500~Red rust | 4000 | 3000 | 2000 | 1000 | 4000 | 500~Creep back White rust | 500~White rust | 240 |
| Damaged Portion (hrs) | 4000 | 5000~White rust | 1000~White rust | 1000 | 240~Red rust | 4000 | 3000 | 1000 | 500 | 4000~White rust | 500 White rust Creep back | 240 | Red rust 120 |
| Cut End (hrs) | 240 | 360 | 168 Creep back | 120 | 48 | 240 | 240 | 240 | 168 | 240 | 24 Creep back | 24 Creep back | Δ~Red rust 24 |
| Weldability | More than 2000 | More than 2000 | More than 2000 | More than 2000 | More than 2000 | More than 2000 | More than 2000 | More than 2000 | More than 2000 | More than 2000 | × More than 2000 | × More than 2000 | × More than 2000 |

| | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Steel Sheet | | | | | | | | | | |
| Ni (wt %) | 13 | 13 | 20 | 15 | 3 | 13 | 13 | 13 | 13 | 13 |
| Co (wt %) | 0.1 | 0.1 | 0.5 | 0.05 | 0.2 | 0.03 | 0.1 | 0.1 | 0.1 | 0.1 |
| Bal. Zn | 20 | 20 | 20 | 20 | 20 | 20 | 5 | 1 | 20 | 20 |
| Coating Amount (g/m²) | | | | | | | | | | |
| Chemical Conversion (mg/m²) | | Electrolytic Chromating 30 | Electrolytic Chromating 30 | Electrolytic Chromating 30 | Electrolytic Chromating 30 | ACCOMET C 50 | Electrolytic Chromating 30 | Electrolytic Chromating 30 | Electrolytic Chromating 30 | Electrolytic Chromating 30 |
| Paint | | | | | | | | | | |
| Zn powder (wt %) | 40 | 60 | 65 | 45 | 30 | 50 | 40 | 40 | 40 | 80 |
| 5% Al—Zn powder (wt %) | — | — | — | 40 | 15 | — | — | — | — | — |
| Ti C powder (wt %) | — | 12 | — | — | — | — | — | — | — | — |
| W C powder (wt %) | — | — | 5 | — | — | — | 5 | — | — | — |
| Ni powder (wt %) | — | — | — | — | 30 | — | — | — | — | — |

TABLE 1-continued

| | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Stainless Steel powder (wt %) | 35 | — | — | — | — | 25 | 35 | 35 | 35 | — |
| Coating Thickness (μ) | 10 | 10 | 10 | 10 | 10 | 10 | 10 | 10 | 10 | 5 |
| Workability*1 | | | | | | | | | | |
| 2 T | ~ | ~ | ~ | Δ | ~ | ~ | ~ | ~ | ~ | ~Δ |
| 3 T | | | | ~Δ | | | | | | |
| 4 T | | | | | | | | | | |
| 5 T | | | | | | | | | | |
| Salt Spray Test | | | | | | | | | | |
| Flat Portion (hrs) | 4000 | 4000 | 4000 | 3000 | 1000 | 4000 | 1000 | 500 | 2000 | 2000 |
| Damaged Portion (hrs) | 4000 | 4000 | 4000 ~ Red rust | 3000 | 1000 ~ White rust Creep back | 4000 | 1000 | 240 ~ Red rust | 1000 | 1000 ~ White rust |
| Cut End (hrs) | 240 | 240 | 240 | 240 | 120 | 240 | 120 | 48 | 240 | 168 |
| Weldability | More than 2000 | More than 2000 | More than 2000 | More than 2000 | More than 2000 | More than 2000 | More than 2000 | More than 2000 | More than 2000 | More than 2000 |

| | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Steel Sheet | | | | | | | | | | |
| Ni (wt %) | 13 | 13 | 15 | 3 | 13 | 13 | 15 | 13 | 13 | 13 |
| Fe (wt %) | 3 | 5 | 5 | 1 | 0.5 | 3 | 5 | 3 | 3 | 3 |
| Cr (wt %) | 0.2 | 0.5 | 3 | 0.2 | 0.1 | 0.2 | 3 | 0.1 | 0.1 | 0.1 |
| Bal. Zn | 20 | 20 | 20 | 20 | 20 | 20 | 20 | 5 | 1 | 20 |
| Coating Amount (g/m²) | | | | | | | | | | |
| Chemical Conversion (mg/m²) | | Electrolytic Chromating 30 | | Electrolytic Chromating 30 | | ACCOMET C 50 | | Electrolytic Chromating 30 | Electrolytic Chromating 30 | |
| Paint | | | | | | | | | | |
| Zn powder (wt %) | 40 | 60 | 65 | 40 | 40 | 40 | 80 | 40 | 40 | 40 |
| 5% Al—Zn powder (wt %) | — | — | — | — | — | — | — | — | — | — |
| Ti C powder (wt %) | — | 12 | — | — | — | — | — | — | — | — |
| W C powder (wt %) | — | — | 5 | — | — | — | — | — | — | — |
| Ni powder (wt %) | — | — | — | — | — | — | — | — | — | — |
| Stainless Steel Powder (wt %) | 35 | — | — | 35 | 35 | 35 | — | 35 | 35 | 35 |
| Coating Thickness (μ) | 10 | 10 | 10 | 10 | 10 | 10 | 10 | 10 | 10 | 5 |
| Workability*1 | | | | | | | | | | |
| 2 T | ~ | ~ | ~ | ~ | ~ | ~ | ~Δ | ~ | ~ | ~ |
| 3 T | | | | | | | ~ | | | |
| 4 T | | | | | | | | | | |
| 5 T | | | | | | | | | | |
| Salt Spray Test | | | | | | | | | | |
| Flat Portion (hrs) | 4000 | 4000 | 4000 | 1000 | 4000 | 4000 | 4000 | 1000 | 500 | 2000 |
| Damaged Portion (hrs) | 4000 | 4000 | 3000 | 1000 | 4000 | 4000 | 4000 ~ White rust 240 | 1000 | 240 ~ Red rust | 1000 |
| Cut End (hrs) | 240 | 240 | 240 | 120 | 240 | 240 | 240 | 120 | 48 ~ Red rust | 240 |

TABLE 1-continued

| | | | | | | | | Ex. 31 | Ex. 32 | Ex. 33 | Ex. 34 | Ex. 35 |
|---|---|---|---|---|---|---|---|---|---|---|---|---|
| Weldability | More than 2000 | More than 2000 | More than 2000 | More than 2000 | More than 2000 | More than 2000 | More than 2000 | | | | | |
| Steel Sheet | | | | | | | | | | | | |
| Al (wt %) | | | | | | | | 5 | 60 | — | — | — |
| Mg (wt %) | | | | | | | | — | — | 5 | — | 5 |
| Mn (wt %) | | | | | | | | — | — | — | 20 | 5 |
| Bal. Zn | | | | | | | | 45 | 45 | 45 | 20 | 20 |
| Coating Amount (g/m$^2$) | | | | | | | | | | | | |
| Chemical Conversion (mg/m$^2$) | | | | | | | | | Electrolytic Chromating 30 | | | |
| Paint | | | | | | | | | | | | |
| Zn powder (wt %) | | | | | | | | 40 | 60 | 65 | 40 | 40 |
| 5% Al—Zn powder (wt %) | | | | | | | | — | 12 | — | — | — |
| Ti C powder (wt %) | | | | | | | | — | — | 5 | — | — |
| W C powder (wt %) | | | | | | | | — | — | — | — | — |
| Ni powder (wt %) | | | | | | | | — | — | — | — | — |
| Stainless Steel powder (wt %) | | | | | | | | 35 | — | — | 35 | 35 |
| Coating Thickness (μ) | | | | | | | | 10 | 10 | 10 | 10 | 10 |
| Workability*¹ | | | | | | | | | | | | |
| 2 T | | | | | | | | | | | | |
| 3 T | | | | | | | | | | | | |
| 4 T | | | | | | | | | | | | |
| 5 T | | | | | | | | ? | ? | ? | ? | ? |
| Salt Spray Test | | | | | | | | | | | | |
| Flat Portion (hrs) | | | | | | | | 4000 | 4000 | 4000 | 4000 | 2000 |
| Damaged Portion (hrs) | | | | | | | | 3000 | 4000 | 2000 | 1000 | 1000 |
| Cut End (hrs) | | | | | | | | 360 | 360 | 240 | 240 | 120 |
| Weldability | | | | | | | | More than 2000 | More than 2000 | More than 2000 | More than 2000 | More than 2000 |

*¹Evaluated by the peel off of the paint after taping
*²Tradename, a roll-on chromate coating manufactured by Kansai Paint KK, Japan

What is claimed is:

1. A weldable paint-coated steel sheet having improved corrosion resistance, weldability and workability, comprising a zinc alloy coated steel substrate containing 3 to 80% by weight of iron in the zinc alloy coating and a paint coating applied thereupon, said paint coating containing:
   (1) not less than 70% by weight of zinc alloy powder with respect to the non-volatile matter of the paint, or
   (2) at least one metal powder selected from the group consisting of zinc powder in amounts not less than 5% and zinc alloy powder in amounts not less than 40% by weight, said metal powder being used together with at least one powder selected from the group consisting of hard electric conductive powder in amounts not less than 20% and carbide powder in amounts not less than 5% by weight, all percentages being based on the total non-volatile matter in the paint coating, wherein the zinc alloy coating is present on the steel sheet in an amount of at least 1 g/m$^2$ and the paint coating thickness is in the range of 3 to 20μ.

2. A weldable paint-coated steel sheet having improved corrosion resistance, weldability and workability, comprising a zinc alloy coated steel substrate containing 3 to 60% by weight of aluminum in the zinc alloy coating and a paint coating applied thereupon, said paint coating containing:
   (1) not less than 70% by weight of zinc alloy powder with respect to the non-volatile matter of the paint, or
   (2) at least one metal powder selected from the group consisting of zinc powder in amounts not less than 5% and zinc alloy powder in amounts not less than 40% by weight, said metal powder being used together with at least one powder selected from the group consisting of hard electric conductive powder in amounts not less than 20% and carbide powder in amounts not less than 5% by weight, all percentages being based on the total non-volatile matter in the paint coating, wherein the zinc alloy coating is present on the steel sheet in an amount of at least 1 g/m$^2$ and the paint coating thickness is in the range of 3 to 20μ.

3. A weldable paint-coated steel sheet having improved corrosion resistance, weldability and workability, comprising a zinc alloy coated steel substrate containing an effective amount to increase the corrosion resistance of the steel sheet, but not more than 20% by weight of manganese in the zinc alloy coating and a paint coating applied thereupon, said paint coating containing:
   (1) not less than 70% by weight of zinc alloy powder with respect to the non-volatile matter of the paint, or
   (2) at least one metal powder selected from the group consisting of zinc powder in amounts not less than 5% and zinc alloy powder in amounts not less than 40% by weight, said metal powder being used together with at least one powder selected from the group consisting of hard electric conductive powder in amounts not less than 20% and carbide powder in amounts not less than 5% by weight, all percentages being based on the total non-volatile matter in the paint coating, wherein the zinc alloy coating is present on the steel sheet in an amount of at least 1 g/m$^2$ and the paint coating thickness is in the range of 3 to 20μ.

4. A weldable paint-coated steel sheet having improved corrosion resistance, weldability and workability, comprising a zinc alloy coated steel substrate containing an effective amount to increase the corrosion resistance of the steel sheet, but not more than 5% by weight of magnesium in the zinc alloy coating and a paint coating applied thereupon, said paint coating containing:
   (1) not less than 70% by weight of zinc alloy powder with respect to the non-volatile matter of the paint, or
   (2) at least one metal powder selected from the group consisting of zinc powder in amounts not less than 5% and zinc alloy powder in amounts not less than 40% by weight, said metal powder being used together with at least one powder selected from the group consisting of hard electric conductive powder in amounts not less than 20% and carbide powder in amounts not less than 5% by weight, all percentages being based on the total non-volatile matter in the paint coating, wherein the zinc alloy coating is present on the steel sheet in an amount of at least 1 g/m$^2$ and the paint coating thickness is in the range of 3 to 20μ.

5. A weldable paint-coated steel sheet having improved corrosion resistance, weldablility and workability, comprising a zinc allow coated steel substrate containing 3 to 20% by weight of nickel in the zinc alloy and a paint coating applied thereupon, said paint coating containing:
   (1) not less than 70% by weight of zinc alloy powder with respect to the non-volatile matter of the paint, or
   (2) at least one metal powder selected from the group consisting of zinc powder in amounts not less than 5% and zinc alloy powder in amounts not less than 40% by weight, said metal powder being used together with at least one powder selected from the group consisting of hard electric conductive powder in amounts not less than 20% and carbide powder in amounts not less than 5% by weight, all percentages being based on the total non-volatile matter in the paint coating, wherein the zinc alloy coating is present on the steel sheet in an amount of at least 1 g/m$^2$ and the paint coating thickness is in the range of 3 to 20μ.

6. A weldable paint-coated steel sheet according to claim 5 in which the zinc alloy coating further contains effective amounts to increase the corrosion resistance of the steel sheet of cobalt, chromium, and iron, wherein the amounts of cobalt and chromium each do not exceed 3% by weight, respectively, and the amount of iron does not exceed 5% by weight.

7. A paint coated steel sheet according to claim 5 in which the paint coating contains at least 70 weight percent of the zinc alloy powder based on the total amount of non-volatile materials in the paint coating.

8. A paint coated steel sheet according to claim 5 in which the paint coating contains at least 40% by weight of zinc alloy powder and 20% by weight or larger of a hard metallic powder, both based on the total amount of non-volatile matter in the paint coating.

9. A paint-coated steel sheet according to any of claims 5-4, in which the zinc alloy powder includes at least one member selected from the group consisting of aluminum, titanium, magnesium, manganese, copper, nickel and cobalt.

10. A paint-coated steel sheet according to any of claims 5-4, in which the hard electric conductive powder includes at least one selected from the group consisting of iron, nickel, cobalt, manganese, chromium, their alloys in metal powder form, and at least one member selected from the group consisting of carbides of titanium, zirconium, hafnium, vanadium, niobium, tantalum, chromium, tungsten, molybdenum, and their mixtures.

* * * * *